3,674,445
VAPOR DEPOSITED ZINC COATED METALLIC SUBSTRATES HAVING ORGANIC COATINGS

Stanley Thaddeus Wlodek, Bethel Park, Pa., assignor to Jones & Laughlin Steel Corporation, Pittsburgh, Pa.
Filed May 13, 1968, Ser. No. 728,631
Int. Cl. B23p 3/00
U.S. Cl. 29—195                     8 Claims

ABSTRACT OF THE DISCLOSURE

Metallic substrates are provided with adherent surface finishes of paints, lacquers, plastics and the like by the use of intermediate adherence-promoting vacuum vapor deposited zinc coatings.

---

This invention relates to metallic substrates having adherent functional and/or decorative surface finishes of paints, lacquers, plastics and the like, a tight bond between the finishes and the substrates being obtained by the use of intermediate vacuum vapor deposited zinc coatings.

Organic coatings are often provided on steel and other metal substrates for corrosion prevention and other functional purposes. The coatings are used also to provide decorative finishes. Generally, a metallic surface must undergo extensive pretreatment to insure that the organic coating will bond itself tightly thereto.

I have discovered that a tightly adherent organic coating can be provided on a metallic surface by interposing a vacuum vapor deposited zinc coating between the metallic surface and the organic coating.

I have as an object of my invention to provide metallic substrates having tightly adherent organic coatings. Another object of my invention is to provide such substrates wherein the bond between the organic coating and the metallic surface is established by an intermediate vacuum vapor deposited zinc coating.

These and other objects and advantages of my invention will appear from the following description with reference to the accompanying drawing in which.

Figure 1:
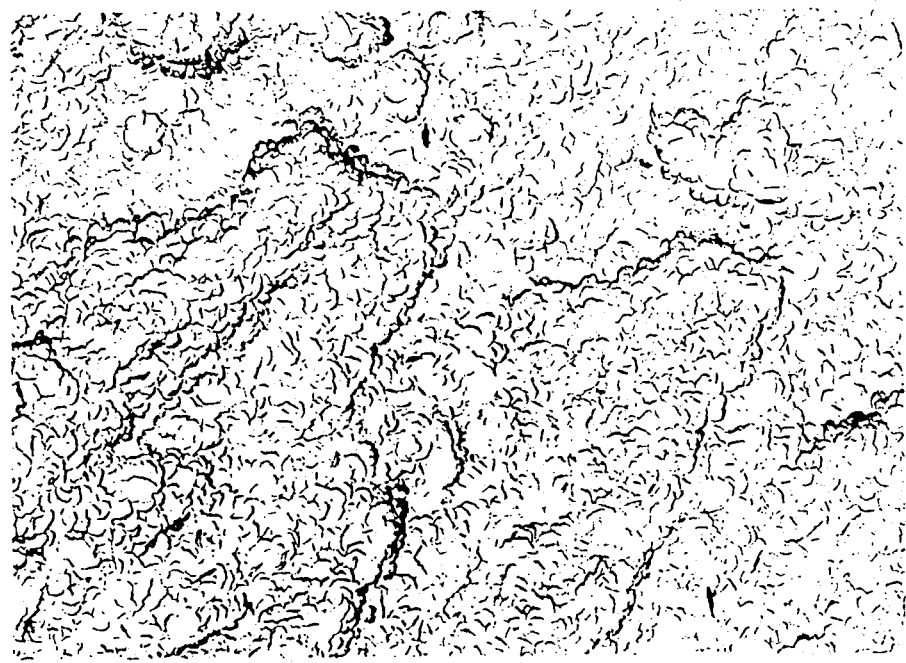
FIG. 1 is an electron microscope photogram of the surface of a vacuum vapor deposited zinc coating taken at 8,750 diameters.

Cold rolled steel strip was coated with zinc by vaporizing the zinc in an evacuated chamber in which the strip was placed and condensing the zinc vapor on it. The details of the zinc coating process are not part of the present invention and are familiar to those skilled in the art of vacuum vapor coating.

Samples of strip so coated were then painted with a vinyl paint and paint adhesion determined. The quality of the paint adhesion was determined by two techniques. In the first, the Conical Mandrel Technique, the samples were bent in a conical mandrel test apparatus of the type described in ASTM Designation D522–60. Briefly, in this test the sample is formed about a conical mandrel so that a linearly extending bend is made along the sample. The radius of curvature of the bend is smallest at the location where the sample is bent about the mandrel adjacent to its apex and gradually increases to a maximum where the sample is bent about the mandrel adjacent to its base. After the samples are formed, a length of adhesive tape is applied along the length of the sample bend and then rapidly removed. As can be understood, the tendency of the paint to part from the sample is greatest along the portion of the bend having the smallest radius of curvature since that is where the greatest amount of deformation has occurred and is least along the portion of the bend having the largest radius of curvature. Consequently, the quality of paint adhesion can be determined by measuring from the end of the bend having the smallest radius of curvature the length along the bend from which paint is peeled by action of the tape.

In the second technique, the Reverse Impact Technique, a drop plunger with a spherical end is thrust against the sample on its unpainted side causing a depression to be formed in that side of the sample. Adhesive tape is fastened to the painted side of the sample over the dome-like protrusion formed in that side of the sample and is then rapidly removed. A series of such tests are carried out on each sample with the force of the thrust increasing in each test. The force in inch-pounds imparted to the sample by the plunger at the time the paint first begins to stick to the adhesive tape and part from the sample surface is noted along with the depth of the depression or draw formed by that force. These values represent a measure of paint adherence.

To compare the adhesion of paint to vacuum vapor coated zinc with the adhesion of paint to other types of zinc coatings, samples of steel strip were galvanized by conventional hot-dip and electrogalvanizing processes. The samples were then painted with the same vinyl paint used on the vacuum vapor coated zinc strip and their paint adhesion determined by both the Conical Mandrel and Reverse Impact Techniques. In order to determine the relative effects of subjecting the zinc coatings to prepaint treatments, the coatings were Bonderized and then painted with the same vinyl paints and tested for paint adhesion quality. The results of these tests are tabulated below:

| Coating | Prepaint treatment | Reverse impact | | Conical mandrel (peel length-inches) |
|---|---|---|---|---|
| | | Force (in.-lbs.) | Draw (mil.) | |
| Vacuum vapor zinc | None | 76 | 126 | 2.6 |
| | Bonderized | 111 | 145 | 0 |
| Hot-dip zinc | None | 0 | 0 | 6.0 |
| | Bonderized | 4 | 2 | 6.0 |
| Electrogalvanized | None | 0 | 0 | 6.0 |
| | Bonderized | 7 | 20 | 6.0 |

From the table it can be seen that the paint adhesive properties of hot-dip zinc and electrogalvanized coatings which have not been treated are extremely poor. The samples used in the Conical Mandrel test were six inches long, and as the table indicates, the paint parted from the hot-dip and electrogalvanized coatings along the entire length of the bend. The Reverse Impact test results indicate the fact that the paint peeled from the hot-dip and electrogalvanized coatings in the absence of the application of any force. The untreated vacuum vapor deposited zinc coatings on the other hand demonstrated paint adhesive properties such as to make them useful for promoting the adhesion of organic coatings to metallic substrates in commercial application. Subjecting the samples to a conventional bonderizing treatment improved paint adhesion somewhat for all the coatings but the adhesion of the paint to the vacuum vapor deposited zinc coatings was still significantly improved over the hot-dip and electrogalvanized coatings.

Figure 2:
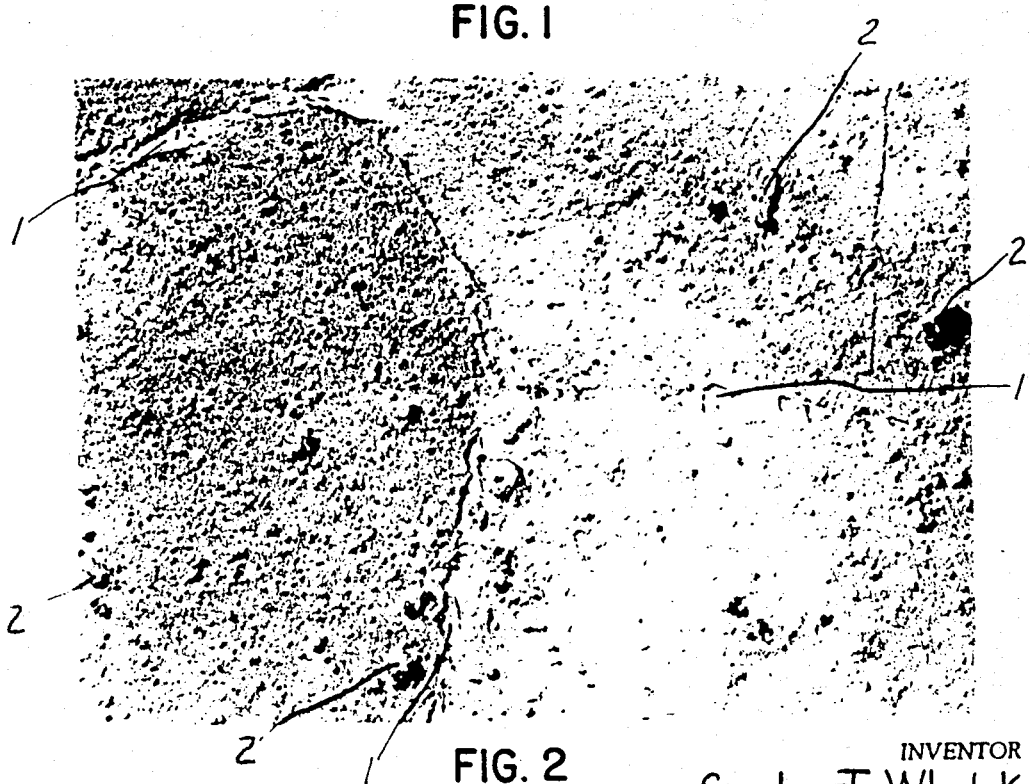
FIG. 2 is an electron microscope photogram of the surface of a hot-dip zinc coating taken at 8,750 diameters.

Improved adhesion to steel substrates provided with intermediate vacuum deposited zinc coatings has also been obtained for paints containing alkyds, acrylics, silicones, epoxies and mixtures thereof. The reasons why vacuum deposited zinc coatings promote the adhesion of organic coatings to metallic substrates appear to be at least twofold. First, the zinc coatings because they are deposited by what amounts to a distillation process have extremely clean and pure surfaces, i.e., surfaces free of contaminants, inclusions and the like, and second, the vacuum deposited zinc coatings include a multitude of minute crystal surfaces which create sites to which the organic coatings can mechanically lock. The surface of the hot-dip zinc coating shown in FIG. 2 includes impurity inclusions 1—1 at grain boundaries and oxides 2—2 over the whole surface, which mitigate against good organic coating adhesion. In addition, the surface is relatively smooth. The surface of the vacuum deposited zinc coating shown in FIG. 1 is clean and is free of adherence-offsetting second phases. Also the surface has a microroughness which is of some depth so as to enable the organic coatings to lock onto the zinc coating.

Because it is the nature of the zinc coating surface which is primarily responsible for promoting organic coating adhesion to an underlying metallic base, it will be appreciated that vacuum deposited zinc coatings can be employed to promote organic coating adhesion to substrates of steel, aluminum, copper and other metallic bases to which the zinc can be made to adhere.

The thickness of the zinc coating is not critical in promoting organic coating adhesion, and I have found that zinc thicknesses of as low as 0.1 mil can be employed. Generally, a minimum zinc coating thickness of about 0.5 mil is required if it is desired that the zinc provide corrosion protection to the underlying metallic base.

I claim:

1. An article of manufacture comprising a metallic substrate, a vacuum vapor deposited coating of zinc on said substrate and an adherent organic coating on said zinc.

2. An article as recited in claim 1 wherein the zinc coating is about 0.1 mil thick.

3. An article as recited in claim 1 wherein the substrate is selected from the group consisting essentially of steel, aluminum and copper.

4. An article as recited in claim 3 wherein the organic coating is selected from the group consisting of paints, plastics and lacquers.

5. An article as recited in claim 1 wherein the substrate is steel.

6. An article as recited in claim 5 wherein the organic coating is selected from the group consisting of plaints, plastics and lacquers.

7. An article as recited in claim 5 wherein the organic coating is a paint selected from the group consisting of epoxies, vinyls, silicones, acrylics, alkyds and mixtures thereof.

8. An article as recited in claim 7 wherein the paint is a vinyl.

References Cited

UNITED STATES PATENTS

| | | | |
|---|---|---|---|
| 2,812,270 | 11/1957 | Alexander | 117—107 X |
| 2,993,806 | 7/1961 | Fisher et al. | 117—107 X |
| 3,278,331 | 10/1966 | Taylor et al. | 117—71 M X |
| 3,326,177 | 6/1967 | Taylor | 117—107 X |

ALFRED L. LEAVITT, Primary Examiner

C. K. WEIFFFENBACH, Assistant Examiner

U.S. Cl. X.R.

117—71 M, 107